Jan. 27, 1959 — R. P. MEECE — 2,870,469
MOTOR VEHICLE SNOW BROOM
Filed April 8, 1957 — 2 Sheets-Sheet 1
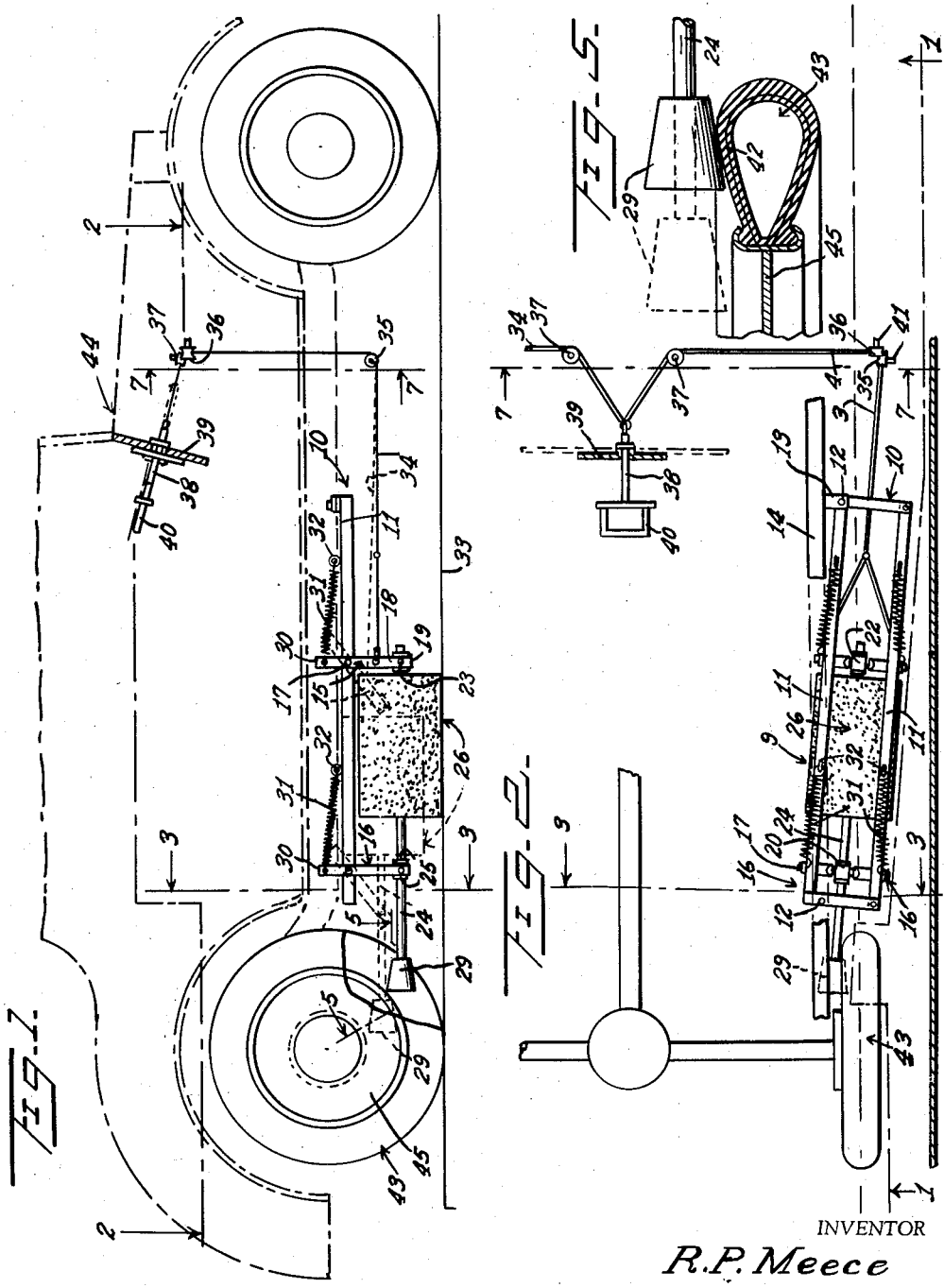
INVENTOR
*R. P. Meece*
BY *John N. Randolph*
ATTORNEY Jan. 27, 1959  R. P. MEECE  2,870,469
MOTOR VEHICLE SNOW BROOM
Filed April 8, 1957  2 Sheets-Sheet 2
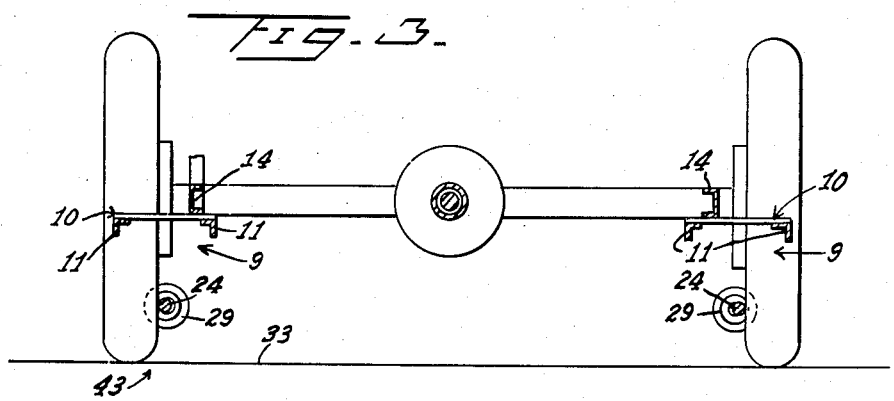
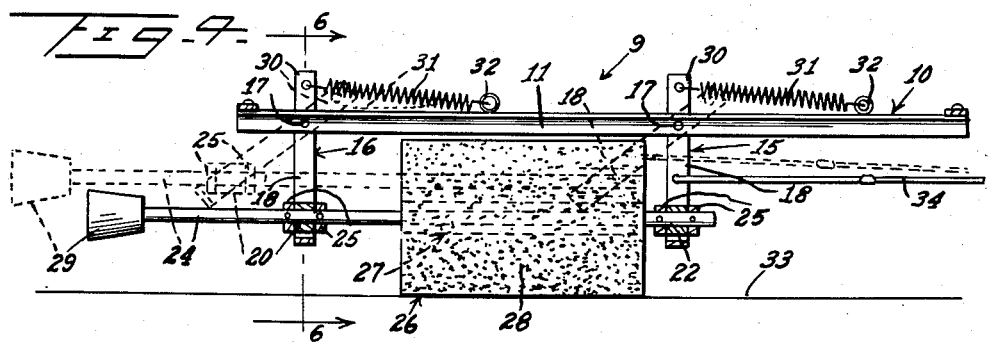
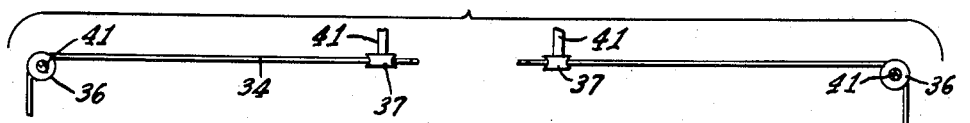
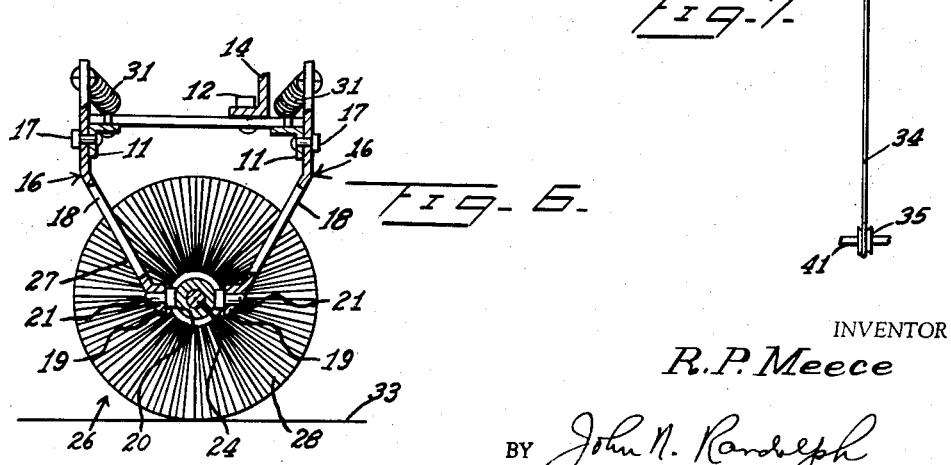
INVENTOR
*R. P. Meece*
BY *John N. Randolph*
ATTORNEY

United States Patent Office 2,870,469
Patented Jan. 27, 1959

2,870,469
MOTOR VEHICLE SNOW BROOM

Ralph P. Meece, Cincinnati, Ohio

Application April 8, 1957, Serial No. 651,395

5 Claims. (Cl. 15—82)

This invention relates to a broom or brush for sweeping snow to form a path in front of a rear driving wheel of a motor vehicle so that adequate traction will be afforded the driving wheel to enable it to propel the vehicle.

More particularly, it is an aim of the present invention to provide such a snow broom or brush two of which are adapted to be employed as a pair for sweeping paths simultaneously in front of the two rear driving wheels of a motor vehicle, and which brooms or brushes are revolved by a friction drive for sweeping or brushing snow toward the center of the vehicle and so that a cleared path will be formed in front of each rear wheel.

More particularly, it is an object of the invention to provide a unit which may be readily mounted beneath a motor vehicle including a circular brush or broom driven by a friction wheel through contact with the tire of the rear wheel in front of which the broom is disposed.

Another object of the invention is to provide such a unit which is normally supported in an inoperative position with the brush or broom elevated above the surface engaged by the vehicle tires and with the friction wheel out of contact with the rear wheel and tire, and which unit is provided with manually operated means for displacing the brush downwardly into a position for contacting a roadway and for simultaneously moving the friction wheel into frictional engagement with a vehicle tire, in front of which the brush is disposed.

Other objects and advantages of the invention will hereinafter become more fully apparent from the following description of the drawings, illustrating a presently preferred embodiment thereof, and wherein:

Figure 1 is a side elevational view of the snow broom shown applied and in an operative position and taken substantially along the line 1—1 of Figure 2;

Figure 2 is a plan view taken substantially along the line 2—2 of Figure 1 and showing a portion of a motor vehicle on which the snow broom is mounted;

Figure 3 is a cross sectional view through the motor vehicle and taken substantially along a plane as indicated by the line 3—3 of Figures 1 and 2;

Figure 4 is an enlarged longitudinal, substantially central vertical sectional view, partly in side elevation, of the snow broom;

Figure 5 is an enlarged fragmentary sectional view, taken substantially along a plane as indicated by the line 5—5 of Figure 1;

Figure 6 is an enlarged cross sectional view, taken substantially along a plane as indicated by the line 6—6 of Figure 4, and Figure 7 is a fragmentary transverse vertical sectional view, taken substantially along a plane as indicated by the line 7—7 of Figures 1 and 2.

Referring more specifically to the drawings, the motor vehicle snow broom in its entirety is designated generally 9 and includes an elongated rectangular frame 10 having spaced substantially parallel sides 11 which are preferably formed of angle iron. The frame 10 is secured by fastenings 12 and a bracket 13 to the underside of a side beam or sill 14 of the chassis of a motor vehicle 44 in front of a rear driving wheel 45 of the vehicle. As seen in Figure 2, the frame 10 is set at an angle relative to the longitudinal axis of the vehicle 44 so that the rear end thereof is inwardly offset relative to the forward end.

A pair of front hangers 15 and a pair of rear hangers 16 are supported by the frame 10 in longitudinally spaced relation to one another. The front hangers 15 have upper portions straddling a forward part of the frame 10 and swingably supported on the frame sides 11 by fastenings 17. The front hangers 15 have downwardly converging portions 18 disposed beneath the frame 10 and which terminate in spaced apart journals 19, as best seen in Figure 6. The rear hangers 16 likewise include downwardly converging portions 18, located beneath the frame 10, and spaced journal portions 19. A front bearing 20 is disposed between the journals 19 of the front hangers 15 and has outwardly extending trunnions 21 which turnably fit in said journals for swingably supporting the bearing 20 between the hangers 15. A rear bearing 22, having trunnions 23, is supported in the same manner by the rear hangers 16.

A shaft 24 is supported by and journalled in the bearings 20 and 22. Collars 25 are adjustably secured to the shaft 24 to prevent sliding movement of the shaft in the bearings 20 and 22. A circular brush or broom 26 is mounted on the shaft 24 between the front hangers 15 and rear hangers 16. The brush or broom 26 includes an elongated sleeve-like hub 27 which is fixed to the shaft 24, and a multiplicity of bristles or fibers 28 which are anchored in the hub 27 and radiate outwardly therefrom in all directions. The shaft 24 extends a substantial distance rearwardly from the rear hangers 16 and has a friction wheel 29 secured to its rear end and which is disposed on the inner side of the wheel 45. The friction wheel 29 tapers inwardly or forwardly.

The front hangers 15 and rear hangers 16 have upper portions 30 extending above the hanger pivots 17 and above the frame 10. Contractile springs 31 are connected to said upper hanger ends 30 and extend forwardly therefrom and have their forward ends anchored to the frame sides 11 by eye members 32. The springs 31 urge the lower portions of the hangers 15 and 16 to swing rearwardly and upwardly for normally supporting the broom or brush 26 in an elevated inoperative position above and out of contact with a surface 33 on which the vehicle is supported, as seen in dotted lines in Figures 1 and 4. A flexible member, such as a cable 34, is attached to and extends forwardly from the front hangers 15, below the pivots 17. The cable 34 is trained under and forwardly around a pulley 35 and then extends upwardly over a pulley 36. From the pulley 36 the cable 34 extends laterally toward the center of the vehicle 44 and around the forward side of a pulley 37 and thence rearwardly where its opposite end is connected to an actuating rod 38 which may be slidably supported in a vehicle instrument panel 39 and which has a handle 40 on the inner or rear end thereof. An identical snow sweeping unit 9, as illustrated in Figure 3, is mounted in the other frame side 14 in front of the other rear wheel of the vehicle and the cable 34 thereof also has an end thereof connected to the pull rod 38, as seen in Figure 5. The pulleys 35, 36 and 37 around which the two cables 34 are trained are journalled on shafts 41 which are suitably supported by parts of the vehicle 44, not shown.

As previously stated, the springs 31 will maintain the rotary broom or brush 26 in a raised, inoperative position relative to the surface 33 and with the friction wheel 29 on the inner side of the rear driving wheel 45 and out of contact therewith, as illustrated in dotted lines in Figure 5. This applies to each sweeper unit 9. When it is necessary to sweep a path clear of snow in advance of the two rear driving wheels 45, the handle 40 is grasped and pulled rearwardly or from right to left of Figure 2 to exert a pull on the ends of the cables 34 connected to the rod 38. This will cause the opposite ends of the cables 34 which are connected to the front hangers 15 of the two units 9 to exert a forward pull on said front hangers 15, below the pivots 17 thereof. When this occurs, the hangers 15 are swung downwardly and forwardly and as the collars 25 prevent the shafts 24 sliding in the bearings 20 and 22, said shafts 24 will act as connecting links for causing the rear hangers 16 to swing downwardly and forwardly. This swinging movement of the hangers 15 and 16 of each unit 9 will cause the brush or broom 26 thereof to be swung forwardly and downwardly into contact with the surface 33. Also, the friction wheel 29 will likewise be swung downwardly and forwardly from its dotted line to its full line position of Figures 1 and 5, to bring the tapered friction wheel 29 of each unit 9 into contact with the inner side wall 42 of the tire 43 of the wheel 45, adjacent which the friction wheel 29 is disposed. Assuming that the wheel 45 is being driven in a direction to propel the vehicle 44 forward, or clockwise as seen in Figure 1, the friction wheel 29 by contact with the tire wall 42 will be revolved to revolve the shaft 24 and the brush or broom 26 in a clockwise direction, as viewed in Figure 6, so that the brush or broom 26 will sweep a path in front of the tire 43 by brushing the snow on the surface 33 inwardly or toward the center of the vehicle 44.

It will thus be apparent that the snow broom constitutes a motor vehicle attachment which may be readily applied to a motor vehicle and through the use of a pair of which units, which are simultaneously actuated, will function to effectively sweep paths clear of snow in front of the rear driving wheels of the vehicle to afford traction so that the vehicle can be driven forwardly under conditions, such as pulling grades, where the vehicle could not otherwise operate. It will also be apparent that when pressure is released on the handle 40 that the springs 31 will swing the hangers 15 and 16 of each unit 9 so that the lower portions thereof will swing upwardly and rearwardly to return the broom 26 to an elevated inoperative position and to move the friction wheel 29 to its inoperative position out of contact with the tire 43 and spaced from the wheel 45.

Various modifications and changes are contemplated and may be resorted to, without departing from the function or scope of the invention as hereinafter defined by the appended claims.

I claim as my invention:

1. A motor vehicle snow broom comprising an elongated frame adapted to be secured to the underside of a part of a motor vehicle chassis in front of a rear driving wheel of the vehicle, the longitudinal axis of the frame being disposed nearly parallel to the longitudinal axis of the vehicle, longitudinally spaced hanger means swingably supported by and depending from longitudinally spaced portions of said frame for swinging movement longitudinally of the frame and vehicle, a pair of bearings, trunnion means pivotally mounting said bearings in said hanger means beneath and spaced from the frame, a shaft journalled in and supported nonslidably by said bearings, a circular broom fixed to said shaft, between the bearings and hanger means for rotation with the shaft and a friction wheel fixed to a rear end of said shaft and adapted to engage an inner side wall of the tire of the driving wheel in front of which said frame and broom are disposed whereby said friction wheel will be revolved by rotation of the tire to revolve said shaft and the broom for sweeping snow to clear a path in front of the tire.

2. A snow broom as in claim 1, and spring means connected to a part of said hanger means and to the frame for urging the portions of the hanger means engaged by the bearings to swing upwardly and rearwardly for displacing the broom and friction wheel upwardly and rearwardly to move said broom to an elevated inoperated position and for displacing the friction wheel to an inoperative position out of engagement with the inner side wall of the tire and into a position spaced from the tire and wheel.

3. A snow broom as in claim 2, and means connected to a part of said hanger means and adapted to be manually actuated by the driver of the motor vehicle from a position at the driver's seat for swinging said portions of the hanger means in which the bearings are disposed downwardly and forwardly for moving the broom into an operative position in engagement with the surface on which the vehicle is supported and for moving said friction wheel into an operative position in contact with the inner side wall of the tire.

4. A snow broom as in claim 3, said hanger means comprising pairs of longitudinally spaced hangers, said hangers being pivotally connected to said frame and having portions extending downwardly therefrom in which said bearings are pivotally mounted for rocking movement in the hangers as said hangers are swung relative to the frame, and collars adjustably fixed to said shaft and engaging said bearings to prevent sliding movement of the shaft through the bearings.

5. A snow broom as in claim 1, said friction wheel being tapered forwardly and the portion thereof in contact with the tire wall in the operative position of the friction wheel, being disposed in a plane substantially parallel to the plane of the tire wall engaged by the friction wheel.

References Cited in the file of this patent

UNITED STATES PATENTS

| 427,834 | Campbell | May 13, 1890 |
| 461,735 | Chambers | Oct. 20, 1891 |
| 683,719 | Amrein | Oct. 1, 1901 |

FOREIGN PATENTS

| 900,373 | France | Oct. 2, 1944 |